US012683035B2

(12) United States Patent
Nallet et al.

(10) Patent No.: US 12,683,035 B2
(45) Date of Patent: Jul. 14, 2026

(54) PACKAGE FOR TRANSPORTING AND/OR STORING A SET OF RADIOACTIVE MATERIALS, COMPRISING AN INTERNAL SHOCK-ABSORBER PROVIDED WITH SHOCK-ABSORBING TUBES

(71) Applicant: ORANO NUCLEAR PACKAGES AND SERVICES, Montigny-le-Bretonneux (FR)

(72) Inventors: Stéphane Nallet, Le Mesnil Saint Denis (FR); Fabien Collin, Elancourt (FR); Yohann Gore, Magny-les-Hameaux (FR); Emilie Bouyer, Dampierre en Yvelines (FR); Christophe Vallentin, Palaiseau (FR); Laurent Milet, Tremblay les Villages (FR); Thomas Brion, Montesson (FR); Hervé Ripert, Paris (FR)

(73) Assignee: ORANO NUCLEAR PACKAGES AND SERVICES, Montigny-le-Bretonneux (FR)

( * ) Notice: Subject to any disclaimer, the term of this patent is extended or adjusted under 35 U.S.C. 154(b) by 328 days.

(21) Appl. No.: 18/693,590

(22) PCT Filed: Sep. 20, 2022

(86) PCT No.: PCT/FR2022/051769
§ 371 (c)(1),
(2) Date: Mar. 20, 2024

(87) PCT Pub. No.: WO2023/047051
PCT Pub. Date: Mar. 30, 2023

(65) Prior Publication Data
US 2025/0140430 A1 May 1, 2025

(30) Foreign Application Priority Data
Sep. 21, 2021 (FR) ...................................... 2109932

(51) Int. Cl.
*G21F 5/08* (2006.01)

(52) U.S. Cl.
CPC ...................................... *G21F 5/08* (2013.01)

(58) Field of Classification Search
CPC ..................................... G21F 5/08; G21F 5/12
(Continued)

(56) References Cited

U.S. PATENT DOCUMENTS

2006/0006351 A1 1/2006 Timpert
2016/0125966 A1* 5/2016 De Gasquet ............ G21F 5/008
250/506.1
(Continued)

FOREIGN PATENT DOCUMENTS

DE 2650417 A1 5/1978
JP 2018-165553 A 10/2018

OTHER PUBLICATIONS

International Search Report for PCT/FR2022/051769 dated Dec. 21, 2022.

*Primary Examiner* — Kiet T Nguyen
(74) *Attorney, Agent, or Firm* — McDonald Hopkins LLC

(57) ABSTRACT

A package for transporting and/or storing a set of radioactive materials, comprising an internal shock-absorber housed in the containment chamber and having one or more layers of tubes for absorbing shocks by plastic deformation, the tubes having an annular or substantially annular cross-section. The number and dimensions of the tubes are such that, in an axial view of the package, the ratio of the cumulative projected area of all the tubes in the layer to the surface area defined by the notional circle of smallest diameter in which all these tubes are circumscribed is greater than 0.2. In addition, a minimum transverse spacing is provided between the tubes of a single layer.

19 Claims, 11 Drawing Sheets

(58) Field of Classification Search
USPC ........................................................ 250/506.1
See application file for complete search history.

(56) References Cited

U.S. PATENT DOCUMENTS

| | | | | |
|---|---|---|---|---|
| 2016/0251138 | A1* | 9/2016 | Friedrich | B65D 85/70 220/560.01 |
| 2021/0343437 | A1* | 11/2021 | Crichlow | G21F 5/08 |
| 2024/0212873 | A1* | 6/2024 | Singh | G21F 5/12 |

* cited by examiner

PACKAGE FOR TRANSPORTING AND/OR STORING A SET OF RADIOACTIVE MATERIALS, COMPRISING AN INTERNAL SHOCK-ABSORBER PROVIDED WITH SHOCK-ABSORBING TUBES

CROSS-REFERENCE TO RELATED APPLICATIONS

This is the National Stage application of PCT international application PCT/FR2022/051769, filed on Sep. 20, 2022, which claims the priority of French Patent Application No. 2109932, filed Sep. 21, 2021, both of which are incorporated herein by reference in their entireties.

TECHNICAL FIELD

The present invention relates to the field of radioactive material packages, comprising a packaging as well as an assembly containing radioactive materials housed in a containment chamber defined by the packaging. This set of radioactive materials may for example comprise one or more sealed canisters housing radioactive materials such as waste, or also comprise nuclear fuel assemblies.

PRIOR ART

A package for storing and/or transporting radioactive materials generally includes, as an outer casing, a packaging having a lateral body, a bottom and a lid. These parts of the packaging define a cavity, known as containment chamber, for housing a set containing radioactive materials, for example a basket housing nuclear fuel assemblies, or waste canisters.

The demonstration of safety of the packaging loaded with the set is based in particular on regulatory drop tests. For the case of an axial drop of 9 metres, on the head shock-absorbing cover covering the lid of the packaging, the total mass of the set of radioactive materials bears on this same lid during the impact on the ground. During this so-called "axial drop", very high forces are generated by delay in the system for closing the lid of the packaging, under the effect of the set of radioactive materials housed in the containment chamber. In particular, a great deal of strain is placed on the attachment screws, and, under certain conditions, the set in the containment chamber may impact the lid with a particularly damaging effect on the closing system.

In order to ensure the tightness of the packaging after the axial drop, it may therefore be necessary to limit the forces transmitted by the set of radioactive materials on the lid, by means of a shock-absorbing system placed in the containment chamber, between the lid and this set of radioactive materials.

Generally, such a system includes at least one plastically deformable shock-absorbing device, such as metal foam. To obtain an optimum crushing of the shock-absorbing device, and therefore to dissipate as best as possible the mechanical energy through the plastic deformation of the shock-absorbing device, many solutions have already been proposed in prior embodiments.

Nevertheless, there is still a need to improve these internal shock-absorbers, so as to offer an even better compromise in terms of size, costs and performances.

DISCLOSURE OF THE INVENTION

To meet this need, the object of the invention is a packaging for transporting and/or storing a set of radioactive materials, the packaging comprising a lateral body extending about a longitudinal central axis of the packaging, as well as a bottom and a removable lid respectively arranged at the axial ends of the lateral body of the packaging, the latter delimiting, with the bottom and the removable lid, a containment chamber for housing the set of radioactive materials, the packaging also including an internal shock-absorber housed in the containment chamber and intended to be arranged axially between the removable lid and the set of radioactive materials.

According to the invention, the internal shock-absorber includes a single layer of tubes for absorbing shocks by plastic deformation, or a plurality of layers of tubes for absorbing shocks by plastic deformation, each layer being arranged in a layer plane orthogonal to the longitudinal central axis of the packaging, the shock-absorbing tubes all having, within the same layer, an annular or substantially annular cross-section from at most three different reference cross-sections, each tube extending along a longitudinal central line of the tube and all of the longitudinal central lines of the tubes of the same layer being inscribed in the layer plane of the layer concerned.

In addition, the number and the dimensions of the shock-absorbing tubes of each layer are provided such that, in an axial view of the packaging, the ratio between on the one hand the cumulative projected area of all of the shock-absorbing tubes of the layer, and on the other hand the surface area defined internally by the notional circle of smallest diameter in which all of these shock-absorbing tubes are circumscribed is greater than 0.2. Preferably, this ratio is greater than 0.25. Finally, within each layer, in axial view of the packaging, the shock-absorbing tubes are transversally spaced apart from one another so that in a transverse direction of each tube, the latter has opposite any other tube of the same layer, a minimum transverse spacing greater than or equal to 0.4*Dext, where "Dext" corresponds to the external diameter of the shock-absorbing tube considered. Preferably, the transverse spacing is greater than or equal to 0.5*Dext.

First of all, the invention is based on the implementation of a simple and small internal shock-absorber, based on tubes that are easily available on the market and at fairly low costs, while procuring very high-performance shock-absorbing properties in terms of crushing stress, and of capacity to absorb energy by plastic deformation.

In addition, the high density of tubes within each layer contributes to obtaining a homogeneous crushing stress, above all combined with a minimum transverse spacing provided in order to significantly reduce or prohibit the possible interactions between the tubes during their deformation, which is similar to a kind of ovalisation. In this respect, it should be noted that this minimum transverse spacing is preferably retained so that no contact occurs between the adjacent tubes of the same layer during their deformation, following dropping of the packaging with its removable lid oriented forwards. By making in this way the tubes of the same layers independent of one another, the qualification/certification of the internal shock-absorber can be limited to the crushing of a limited number of tubes, namely as many tubes as there are different reference cross-sections implemented in the shock-absorber (therefore at most three per layer, and more preferably, at most three for the entire internal shock-absorber). This makes the qualification significantly less expensive than when it must concern the whole internal shock-absorber.

Thanks to the use of tubes as elements for absorbing shocks by plastic deformation, it is advantageously observed a crushing curve without buckling or ripple peak. Thus, no pre-crushing operation is required before implementing these tubes within the internal shock-absorber.

Furthermore, the tube shape as well as their open ends facilitates the flow of water and the drying of the internal shock-absorber, and thus prevents implementing a sealed box in which this shock-absorber should be inserted. Consequently, this specific feature contrasts with other internal shock-absorber solutions, such as those based on the use of metal foam.

Moreover, the invention provides for the implementation of the following optional features, taken alone or in combination.

Preferably, each shock-absorbing tube has a ratio, between its wall thickness and its external diameter, between 0.08 and 0.2, and more preferably between 0.09 and 0.15.

Surprisingly, it was noted that this ratio of dimensions led to exceptionally high-performance solutions making it possible to give a moderate size, while generating a crushing stress compatible with the closing system as well as a significant energy absorption capacity.

Preferably, at least some of the tubes are straight, with their longitudinal central lines corresponding to axes of revolution preferably all parallel with one another and/or combined within the same layer.

The parallelism of the tubes contributes to being able to increase the density of tubes within the internal shock-absorber, with for advantages the reduction of the thickness of the shock-absorber, and also a better homogeneity of the crushing stress of the shock-absorber.

According to another possibility, optionally combinable with the preceding, at least some of the tubes are in the shape of an arc of a circle, and/or of concentric tori.

Preferably, the shock-absorbing tubes all having, within the same layer, the same annular or substantially annular cross-section. This further facilitates the qualification/certification of the internal shock-absorber. According to one possibility, the same cross-section is retained for all of the tubes of all of the layers, in the case of a multilayer design of the internal shock-absorber. This specific feature also applies in the case of a single layer.

Preferably, all of the shock-absorbing tubes have an annular or substantially annular cross-section the inner perimeter of which is circular. The same may apply for the outer perimeter, then leading to a so-called annular cross-section. The other possibility of a cross-section that is not strictly annular, but substantially annular, arises when the outer surface of the tube is provided for example with one or more flat sections. It should be noted that this outer surface may moreover be equipped with one or more tenons to improve its holding in the case of dropping and to make sure that the tube deforms as desired without moving, and/or equipped with one or more holes/mortises passing through or not the thickness of the tube. Nevertheless, even provided with these elements, each tube continues to have an annular or substantially annular cross-section.

Preferably, the internal shock-absorber includes a force distribution plate arranged between the set of radioactive materials and the shock-absorbing tubes of the single layer. Such a plate contributes to using the lid of the packaging in a particularly homogeneous way, in the event of dropping of the package.

Preferably, in the case of a multilayer design, the internal shock-absorber includes a force distribution plate arranged between two directly consecutive layers of tubes. This makes it possible to avoid the interactions between the tubes of these two directly consecutive layers, and advantageously leads to better controlled shock-absorbing in the event of dropping of the package.

Preferably, at least some of the shock-absorbing tubes are attached to the force distribution plate by welding.

Preferably, at least some of the shock-absorbing tubes have a mortise and tenon assembly with the force distribution plate. This makes it possible, in a simple way and without requiring skilled labour, to ensure the holding in place of the tubes and to prevent them from slipping during their deformation, in the event of dropping of the package, in particular during an oblique drop.

Preferably, the internal shock-absorber is attached on the removable lid so as to be in contact with an inner surface of this lid, the attachment preferably being performed by welding or by screw elements. Alternatively, the internal shock-absorber may be placed freely between this same lid, and the set of radioactive materials.

Preferably, the shock-absorbing tubes are made of stainless steel.

Preferably, within the internal shock-absorber, certain straight tubes are arranged coaxially. This makes it possible for example to form lines of shock-absorbers extending locally over a large part, or even over all or almost all of the width of the removable lid, while facilitating the production of these lines by creating each of them with tubes of relatively short lengths, and arranged end to end.

Preferably, the lid is mounted on a front end of the lateral body of the packaging using screw elements distributed around the periphery of the lid.

Another object of the invention is a package comprising such a packaging, as well as a set of radioactive materials housed in the containment chamber of the packaging.

Preferably, the set of radioactive materials comprises one or more sealed canisters housing radioactive materials, or it comprises a storage basket housing a plurality of nuclear fuel assemblies. Other advantages and features of the invention will become apparent in the following non-limiting detailed description.

BRIEF DESCRIPTION OF THE DRAWINGS

This description will be given with reference to the appended drawings wherein.

DETAILED DISCLOSURE OF PARTICULAR EMBODIMENTS

Figure 1:
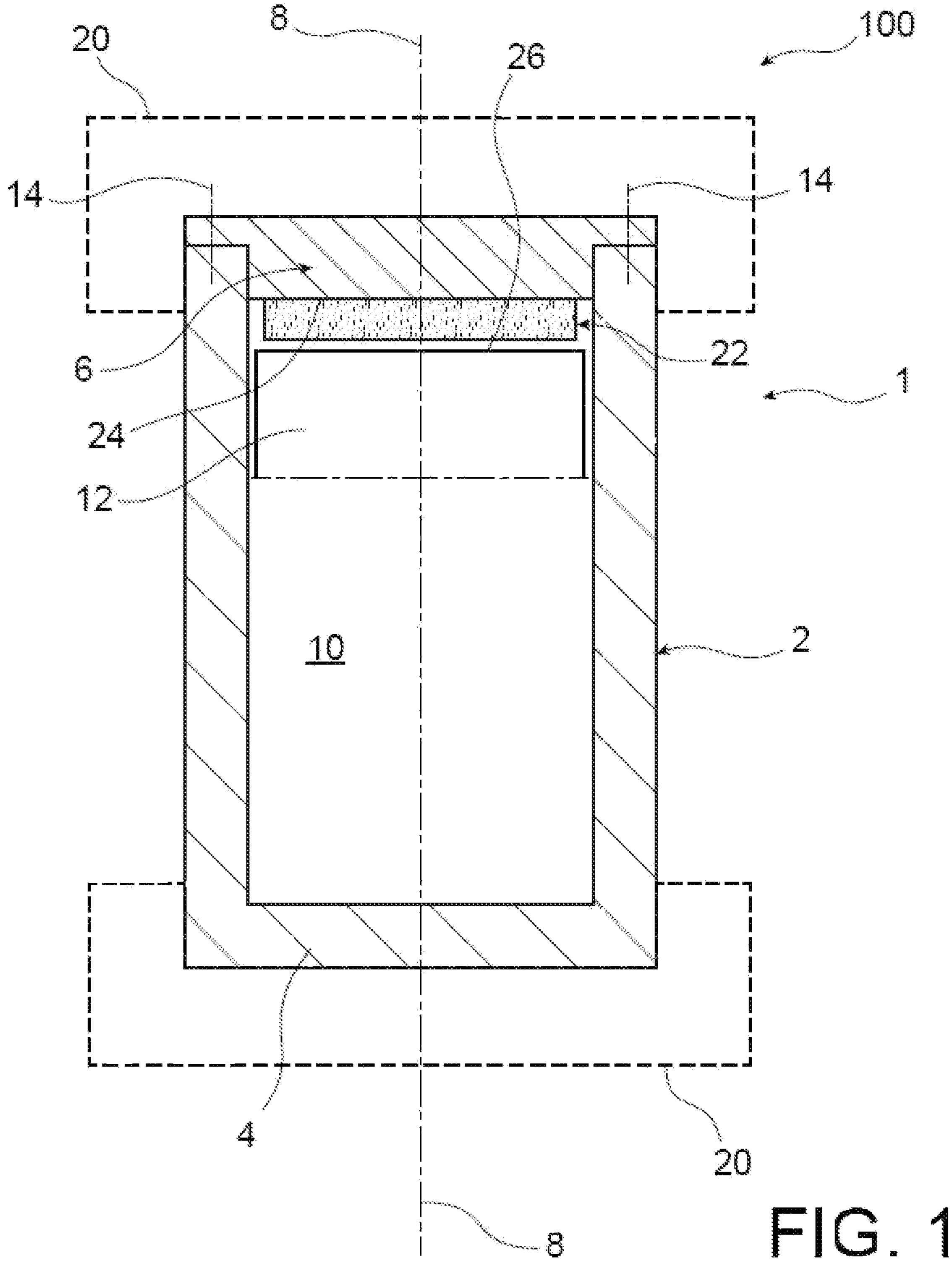
FIG. 1 shows a schematic axial sectional view of a package according to a preferred embodiment of the present invention.

First of all, FIG. 1 shows a package 100 for storing and/or transporting radioactive materials, in the form of a preferred embodiment of the present invention.

The package 100 includes first of all a packaging 1 provided with a lateral body 2, a bottom 4 and a removable lid 6 sealing an opening of the packaging opposite the bottom 4. The packaging has a longitudinal central axis 8 about which the lateral body 2 extends, this axis 8 passing through the lid 6 and the bottom 4 respectively arranged at the front and rear ends of the lateral body 2 of the packaging. As schematically illustrated in FIG. 1, the bottom 4 may be produced in one piece with the lateral body 2 of the packaging. The lid 6 for its part is connected to the front end of the lateral body 2, corresponding to the top end in the vertical position of the packaging shown in FIG. 1. The attachment of this lid 6 is preferably performed using screw elements 14, distributed around the periphery of the lid.

The lateral body 2, the lid 6 as well as the bottom 4 delimit a containment chamber 10 used for housing a set of radioactive materials 12. This set 12, also centred about the axis 8, here comprises a sealed canister containing waste. Alternatively, it may concern a plurality of canisters placed in the containment chamber 10, or also a storage basket housing a plurality of nuclear fuel assemblies. As shown in dotted lines in FIG. 1, at the ends of the package considered in the direction of the axis 8, the packaging may be equipped with shock-absorber covers 20 respectively protecting the lid 6 and the bottom 4 of the packaging.

The packaging 1 is also equipped with an internal shock-absorber 22 specific to the invention, only shown schematically in FIG. 1. This internal shock-absorber 22 is housed in the containment chamber 12, axially between an inner surface 24 of the lid 6, and an axial end surface 26 of the set of radioactive materials 12. Preferably, as will be described subsequently, the internal shock-absorber 22 is attached on the lid 6 so as to be in contact with the inner surface 24. The attachment is carried out for example by welding or by screw elements. In other embodiments, the internal shock-absorber 22 may be attached on the set 12, or also arranged freely between the lid 6 and this same set 12.

Figure 2:
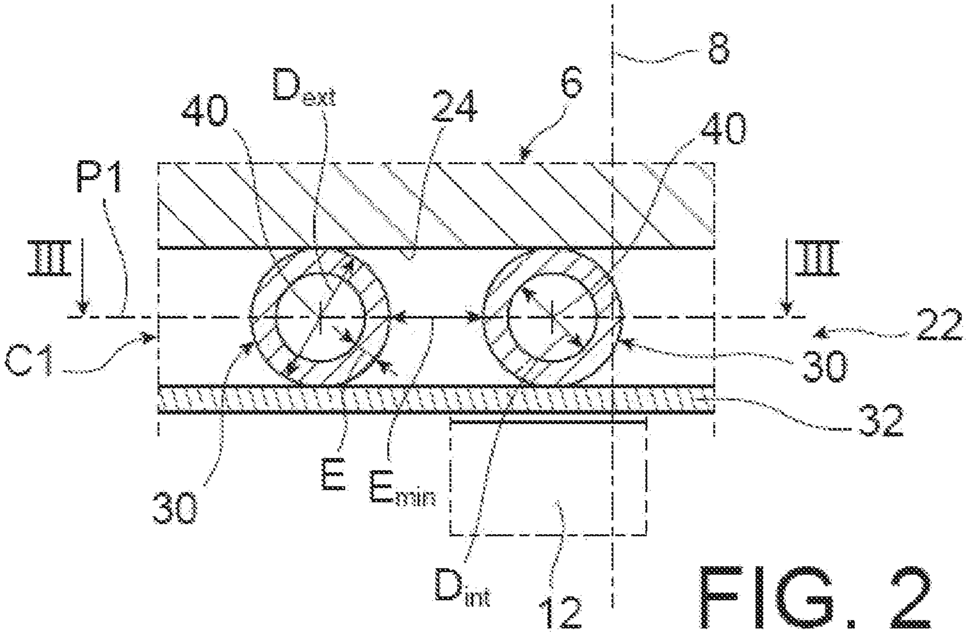
FIG. 2 shows an axial sectional view of a part of an internal shock-absorber equipping the packaging of the package shown in the preceding figure, according to a preferred embodiment of the invention.
Figure 2A:
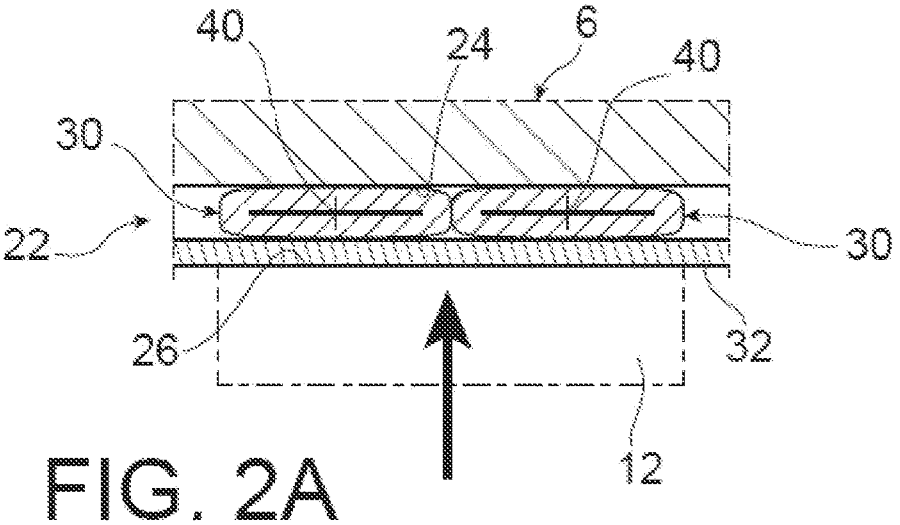
FIG. 2A is a sectional view similar to that of FIG. 2, with the internal shock-absorber being in its plastically deformed configuration following dropping of the package.
Figure 3:
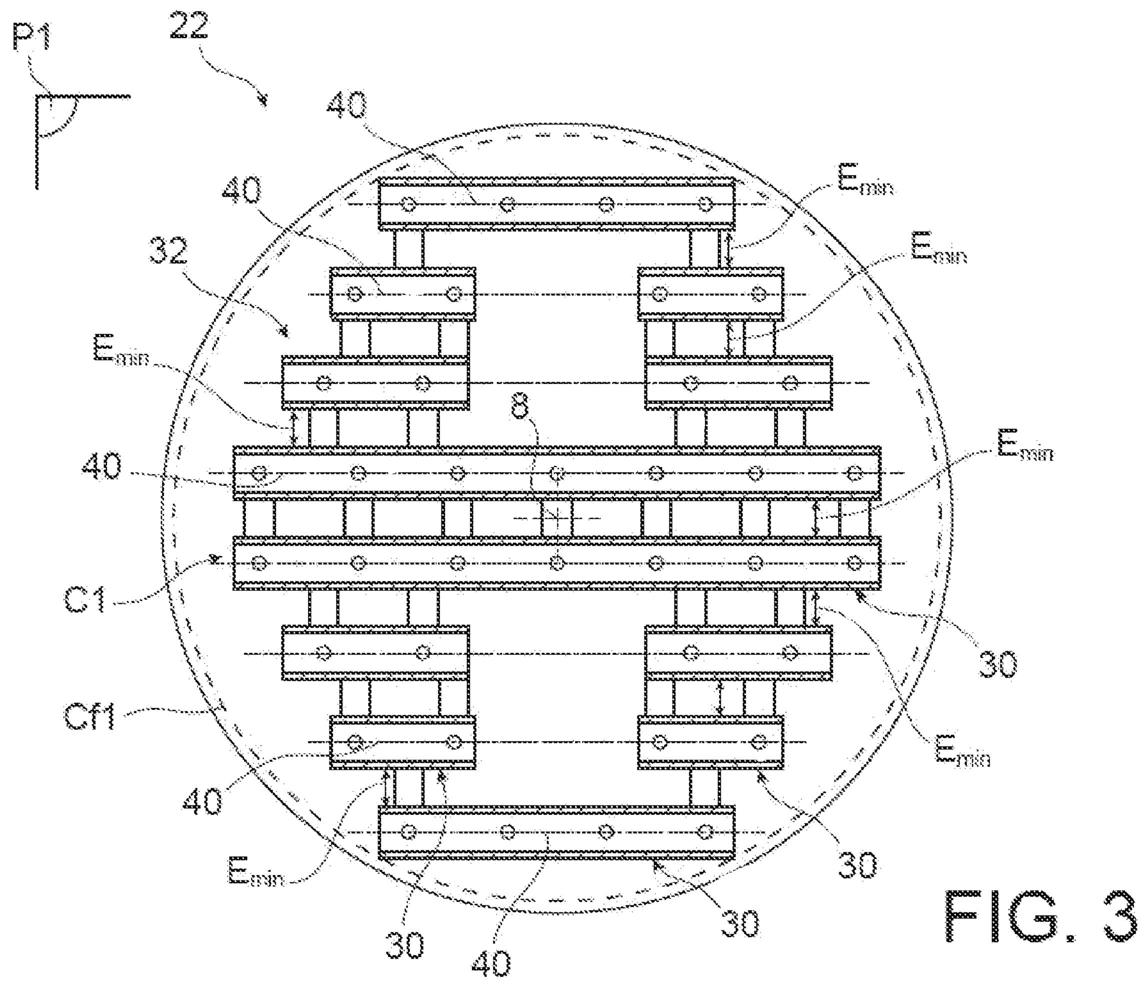
FIG. 3 is a sectional view taken along the line III-III of FIG. 2.

Now with reference to FIGS. 2, 2A and 3, the internal shock-absorber 22 is shown according to a preferred embodiment of the invention. In this embodiment, the internal shock-absorber 22 includes a single layer C1 of tubes 30 for absorbing shocks by plastic deformation, these tubes 30 preferably being made of stainless steel. The single layer C1 is arranged in a layer plane P1 orthogonal to the longitudinal central axis 8. This plane P1 is parallel to a force distribution plate 32 also oriented transversally, and that completes the internal shock-absorber 22. The plate 32 supports the tubes 30 that are attached thereon for example by welding, so as to be held tightly axially between the inner surface 24 of the lid 6, and a bearing surface of the plate 32. The latter is thus arranged between the tubes 30 and the set of radioactive materials 12.

Figure 4:
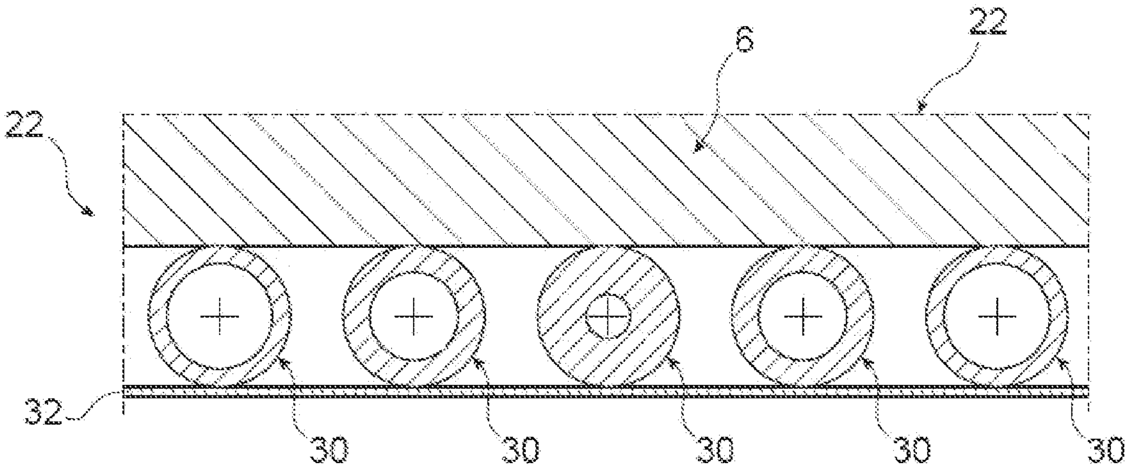
FIG. 4 is a view similar to that of FIG. 2, with the shock-absorber shown according to another alternative embodiment.

In this embodiment, the shock-absorbing tubes 30 of the single layer C1 all have the same annular cross-section. Nevertheless, the layer C1 may include up to three different types of tubes 30, respectively having three distinct reference cross-sections. Such an example is shown in FIG. 4. At the opposite ends of the layer C1, two tubes 30 are provided having the same annular cross-section corresponding to a first reference cross-section. At the centre, one tube 30 is provided having a different annular cross-section corresponding to a second reference cross-section, whereas in the two spaces between the end tubes and the centre tube, two tubes 30 are respectively provided having the same annular cross-section corresponding to a third reference cross-section. Of course, the number and the arrangement of these tubes 30 of different shapes may be modified depending on the needs encountered, one of the objectives being to locally adapt the crushing stress of the tube depending on the part of the set 12 that is located opposite.

Even if all of the tubes shown in FIG. 4 have the same external diameter, it may be otherwise. Thus, the tubes of the layer C1 may also have three different annular cross-sections but obtained using three different external diameters. In particular, this makes it possible to make sure that the deformation of all of the tubes is not initiated at the same time, but in a sequenced way for a more progressive use of the closing system in the event of dropping. This configuration is applicable with or without the distribution plate, in the case of a single layer or in a multilayer design that will be presented below.

In the embodiment of FIGS. 2, 2A and 3, all of the tubes 30 are of straight shape, and of identical or different lengths. Each tube 30 extends along a longitudinal central line 40 of the tube, which here corresponds to its axis of revolution. In addition, the axes 40 of all of the tubes 30 of the layer C1 are inscribed in the layer plane P1, by also preferably being parallel to one another and/or combined, so as to increase the number of tubes within the internal shock-absorber. Indeed, FIG. 3 shows that certain tubes 30 are attached parallel to one another on the distribution plate 32, whereas others are arranged coaxially, by being more or less spaced apart from one another.

As indicated above, all of the tubes 30 of the layer C1 are of the same type, by having the same reference cross-section. This annular cross-section is produced by a circular outer perimeter of external diameter referenced "Dext", as well as by a circular inner perimeter of internal diameter referenced "Dint". These two perimeters, centred on the axis 8, are identical along the entire length of each tube 30, the cross-section of the latter being constant. Locally, these tubes 30 of annular cross-section may nevertheless be equipped with one or more tenons/holes/mortises to guarantee the holding of these tubes during their crushing in the event of dropping of the package, as will be subsequently detailed.

One of the specific features of the invention lies in the choice of tubes 30 as elements for absorbing shocks by plastic deformation, but also in the fact of providing them in a significant quantity within the internal shock-absorber, while spacing them sufficiently apart from one another in order to prevent interactions with one another during their deformation.

This results in a geometry meeting two specific conditions, the first globally concerning the space occupied by the tubes 30 within the layer C1, and the second relating to a minimum transverse spacing between these tubes 30.

As regards the first condition, it is provided that the number and the dimensions of the tubes 30 of the layer C1 are such that, in an axial view of the packaging, the ratio between on the one hand the cumulative projected area of all of the tubes 30, and on the other hand the surface area defined internally by the notional circle Cf1 of smallest diameter in which all of these tubes are circumscribed, remains greater than 0.2, or even greater than 0.25, or also greater than 0.3. The cumulative projected area of the tubes 30 corresponds to that which may be determined using the outer contours of these tubes in FIG. 3, due to the cross-sectional plane III-III passing through the axes of revolution 40, and corresponding to the layer plane C1. The notional circle Cf1 has also been shown in this FIG. 3.

As regards the second condition, it is provided that within each layer C1, still in axial view of the packaging as in FIG. 3, the shock-absorbing tubes 30 are transversally spaced apart from one another so that in a transverse direction of each tube, the latter has opposite any other tube of the same layer C1, a minimum transverse spacing "Emin" greater than or equal to 0.4*Dext, where "Dext" corresponds to the external diameter of the tube 30 considered. More preferably, this minimum transverse spacing "Emin" is greater than or equal to 0.5*Dext.

Figure 2B:
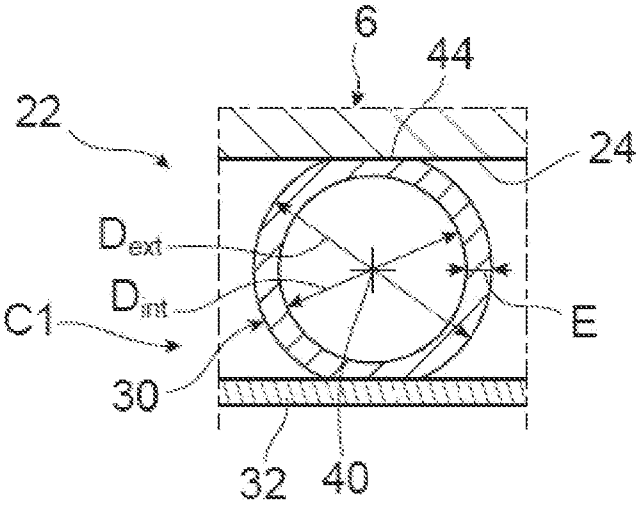
FIG. 2B is a view similar to that of FIG. 2, with the shock absorber shown according to an alternative embodiment.

Thanks to this value and by taking into account the maximum level of deformation provided for the tubes 30 in the event of dropping of the package, it is made sure that these tubes deform plastically without coming into contact with one another. In this respect, FIG. 2B shows a case of complete deformation of the tubes 30 after being dropped, after which the two entirely flattened tubes are therefore extended in the transverse direction in relation to the axis 40, without in as much coming into contact with one another. Of course, when dropping is not supposed to lead to a total deformation of the tubes as in FIG. 2A, these tubes 30 may then be moved closer together within the shock-absorber.

The minimum transverse spacing provided above makes it possible to ensure that all of the tubes 30 will deform in an identical or similar way by absorbing the same amount of energy, and therefore to carry out a simplified qualification/certification concerning only one of these tubes, and not the entire shock-absorber. In the case of FIG. 4 comprising tubes 30 of a plurality of types, but from at most three distinct references only, only one tube of each type must be qualified/certified.

Preferably, each tube 30 has a ratio, between its wall thickness "E" and its external diameter "Dext", between 0.08 and 0.2, and more preferably between 0.09 and 0.15. Unpredictably, it was noted that this ratio made it possible to obtain exceptional shock-absorbing performances, a moderate size, while proposing a crushing stress compatible with the closing system as well as a significant energy absorption capacity.

FIG. 2B shows an alternative embodiment, wherein each tube 30 of the layer C1 has a cross-section that is no longer strictly annular, but substantially annular due to the fact that its outer surface is provided with two flat sections 44. Each of these two flat sections 44 extends parallel to the axis 40 of the tube, preferably over the entire length of this tube. They are intended to form the contact surfaces of the tube respectively with the inner surface 24 of the lid, and the bearing surface of the force distribution plate 32. It should be noted that in this configuration, the external diameter "Dext" of the tube (of its substantially annular cross-section) must be considered as the external diameter at the circular parts not truncated by the flat sections 44.

Figure 5:
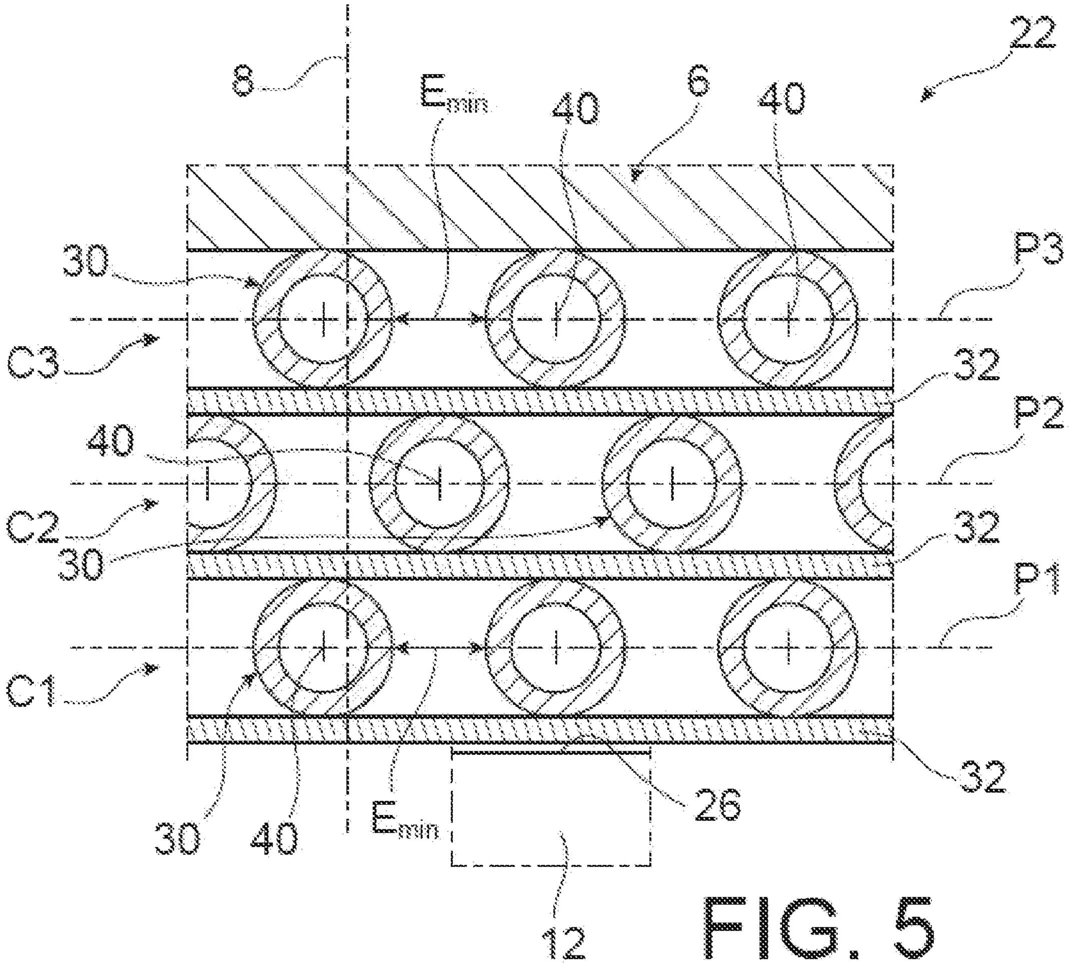
FIG. 5 is a view similar to that of FIG. 2, with the shock-absorber being in the form of another preferred embodiment of the invention.

According to another preferred embodiment of the invention, shown in FIG. 5, the internal shock-absorber 22 no longer comprises a single layer of tubes, but a plurality of layers that are arranged one after another in the direction of the axis 8. Here, this concerns three layers C1, C2, C3, but the number may be different, without departing from the scope of the invention. Each of these layers has a design identical or similar to the single layer that has just been described in the preceding embodiment. One of the specific features here consists in providing a force distribution plate 32 between the directly consecutive layers. These plates are also oriented transversally, and parallel to the layer planes P1, P2, P3 in which respectively the axes 40 of the tubes 30 of the layers C1, C2, C3 are inscribed. In this preferred embodiment, the axes of the tubes 30 of the 3 layers are disposed parallel to one another, but it may be otherwise. The axes of the tubes of a first layer may for example be oriented perpendicular to the axes of the tubes of a second layer, etc.

Thanks to the plates 32, it is advantageously possible to prevent the interactions between the tubes 30 of the various layers, which results in better controlled shock-absorbing in the event of dropping of the package, and therefore easier qualification/certification.

Of course, in the multilayer design in FIG. 5, a distribution plate 32 is also preferably provided between the set of radioactive materials, and the layer of tubes that are located at the end of the stack, as close as possible to this set.

Figure 6:
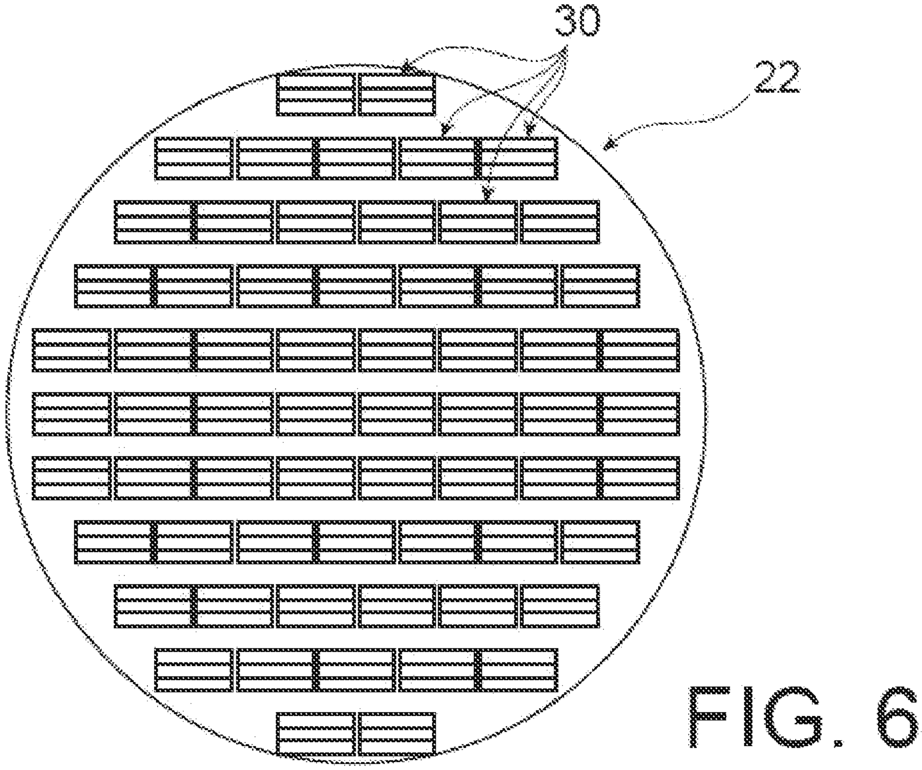
FIG. 6 is a view similar to that of FIG. 3, with the shock-absorber shown according to another alternative embodiment.

FIG. 6 shows the shock-absorber 22 according to an alternative embodiment to the embodiment shown in FIG. 3, in which the tubes 30 arranged parallel and coaxially form shock-absorber lines extending locally over a large part, or even over all or almost all of the width of the lid 6. In this alternative embodiment, to form the lines, the coaxial tubes 30 of short lengths are arranged end to end, with small axial clearances between them.

Figure 7:
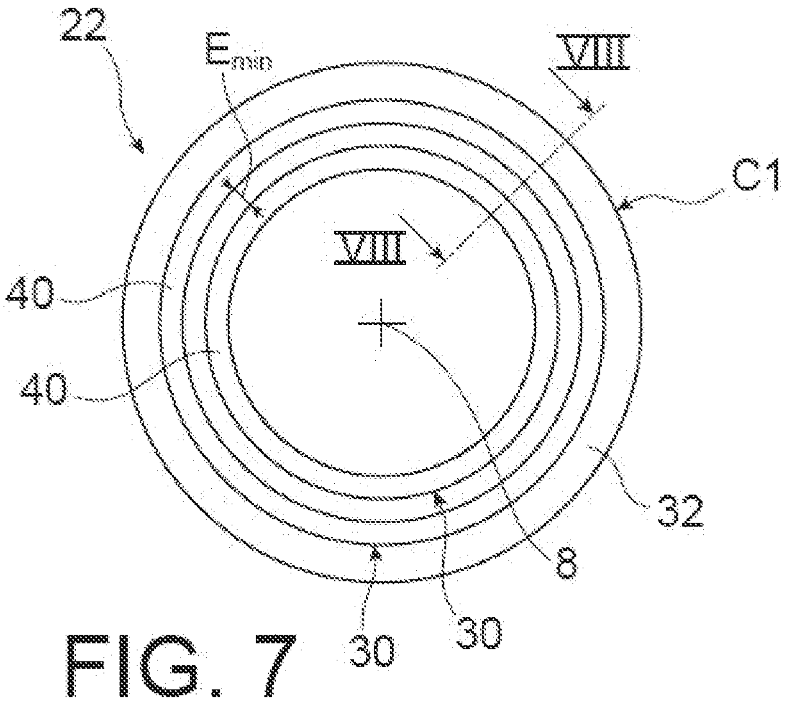
FIG. 7 is an axial top view of the internal shock-absorber being in the form of another preferred embodiment of the invention.
Figure 8:
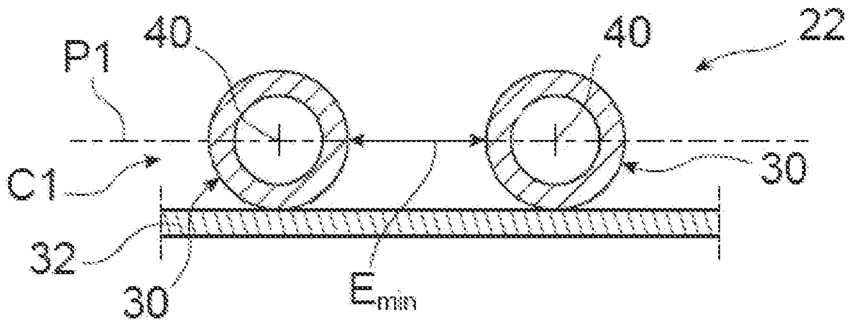
FIG. 8 is a sectional view taken along the line VIII-VIII of FIG. 7.

According to another preferred embodiment shown in FIGS. 7 and 8, the tubes 30 are no longer straight, but in the shape of coplanar and concentric tori. Their longitudinal central lines are thus circles 40 all inscribed in the same plane P1. The particular shape and layout of the tubes 30 also makes it possible here to achieve a high density of tubes within the layer C1, while respecting the minimum transverse spacing "Emin" between the tori.

Figure 9:
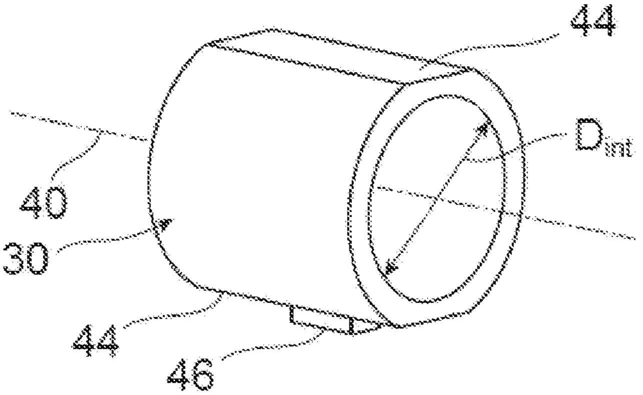
FIG. 9 is a perspective view of a tube for absorbing shocks by plastic deformation, according to a preferred embodiment of the invention.
Figure 10:
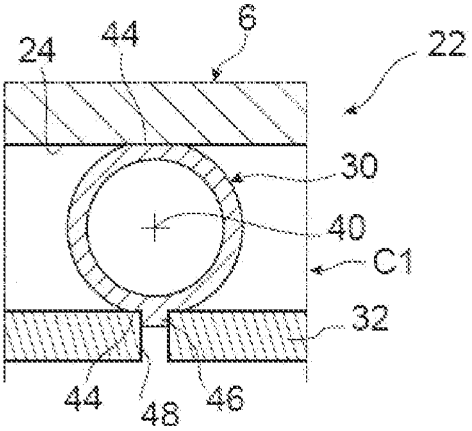
FIG. 10 is a partial axial sectional view of the internal shock-absorber equipped with the tube of FIG. 9.

FIGS. 9 and 10 show a specific feature that applies to all of the embodiments, here with a tube 30 of substantially annular cross-section provided with flat sections 44. To facilitate the holding of the tube 30 between the distribution plate 32 and the lid 6, the flat section 44 that cooperates with the bearing surface of the plate 32 is equipped with a tenon 46, here of substantially parallelepiped shape, preferably with its large length oriented parallel to the axis 40. Indeed, this tenon 46 is housed in a hole/a mortise 48 of complementary shape made in the force distribution plate 32.

This arrangement makes it possible, in a simple way and without requiring skilled labour since no welding is needed, to guarantee the holding in place of the tubes 30 and to prevent them from slipping during their deformation in the event of dropping of the packaging, in particular during an oblique drop. Of course, a plurality of tenons 46 may be provided on the same tube, without departing from the scope of the invention. Likewise, the tenon 46 may be on the plate 32, and the mortise 48 on the tube 30. Such a tube 30 is preferably produced by machining so as to allow the flat sections 44, the internal diameter "Dint", as well as the tenon 46 or the mortise 48 to be shown.

Figure 11:
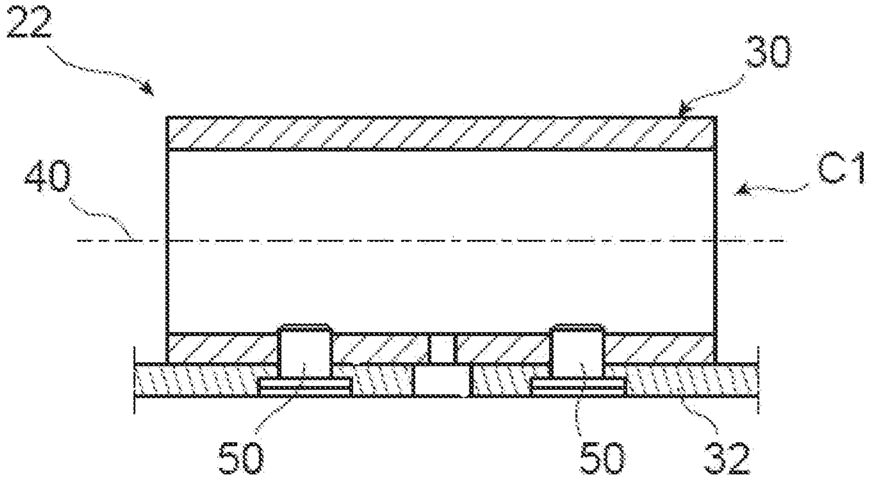
FIG. 11 shows a part of the internal shock-absorber in axial section, and in which means for attaching the shock-absorbing tube to the force distribution plate have been shown.
Figure 12:
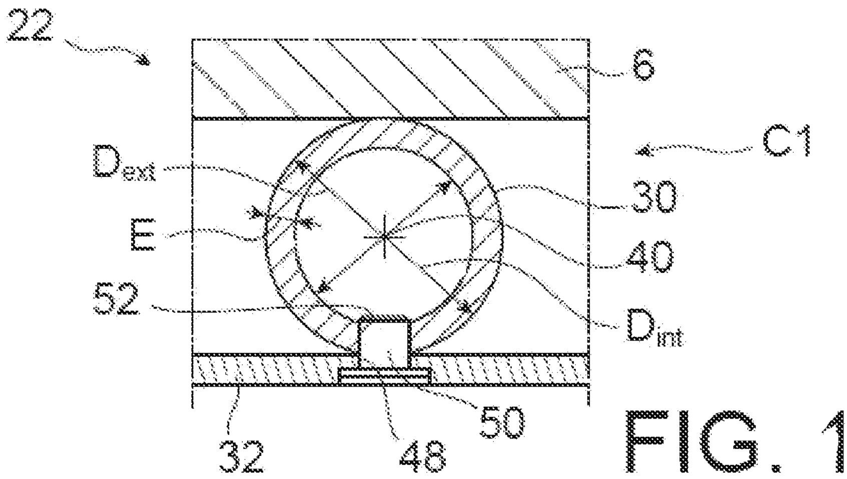
FIG. 12 is a sectional view taken along the line XII-XII of FIG. 11.

FIGS. 11 and 12 show an alternative embodiment for attaching the tubes 30. In the hole 48 of the distribution plate 32, a pin 50 is housed that is preferably welded to this plate, and that protrudes inwardly to penetrate into a hole 52 made in the thickness "E" of the tube 30. A plurality of assemblies of this type may be provided along the tube, as can be seen in FIG. 11 with the representation of two pins 50 welded on the plate 32.

Figure 13:
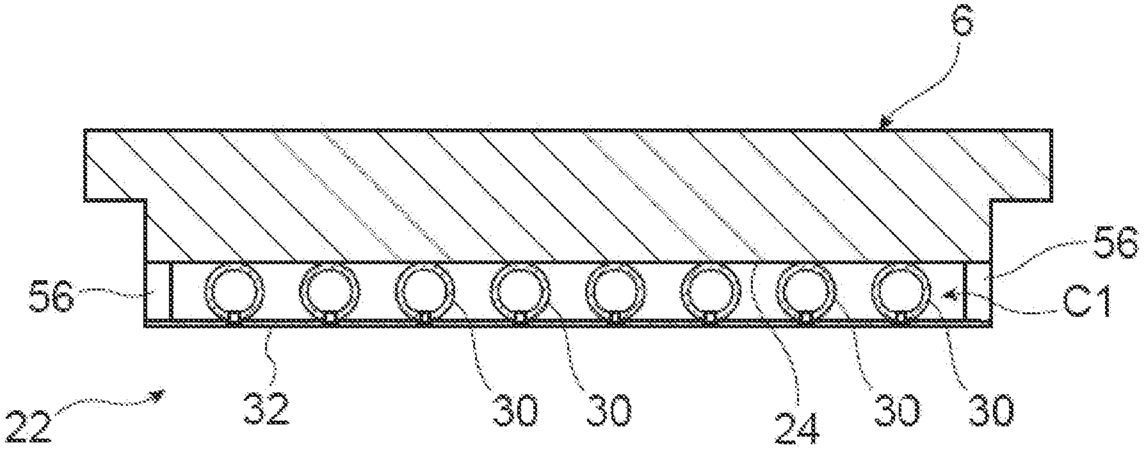
FIG. 13 is an axial sectional view of the packaging lid on which the internal shock-absorber is attached.
Figure 14:
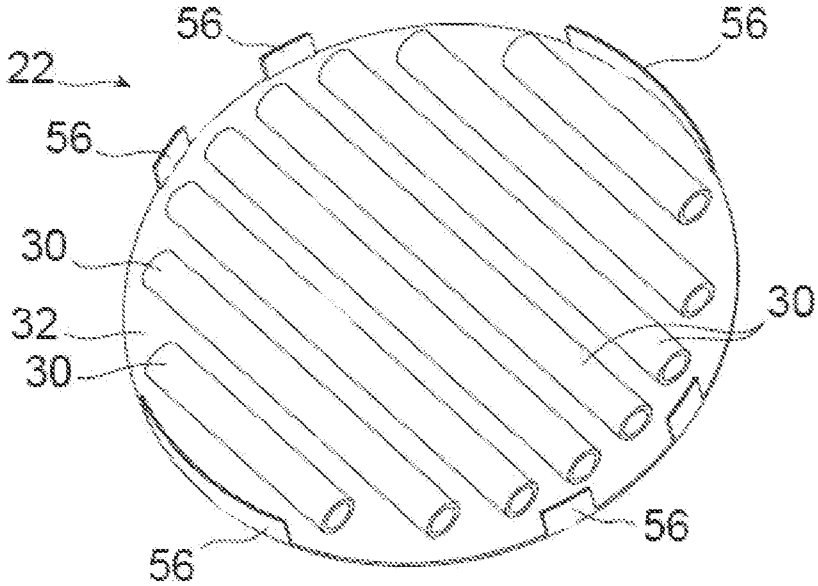
FIG. 14 is a perspective view of the internal shock-absorber shown in FIG. 13.
Figure 15:
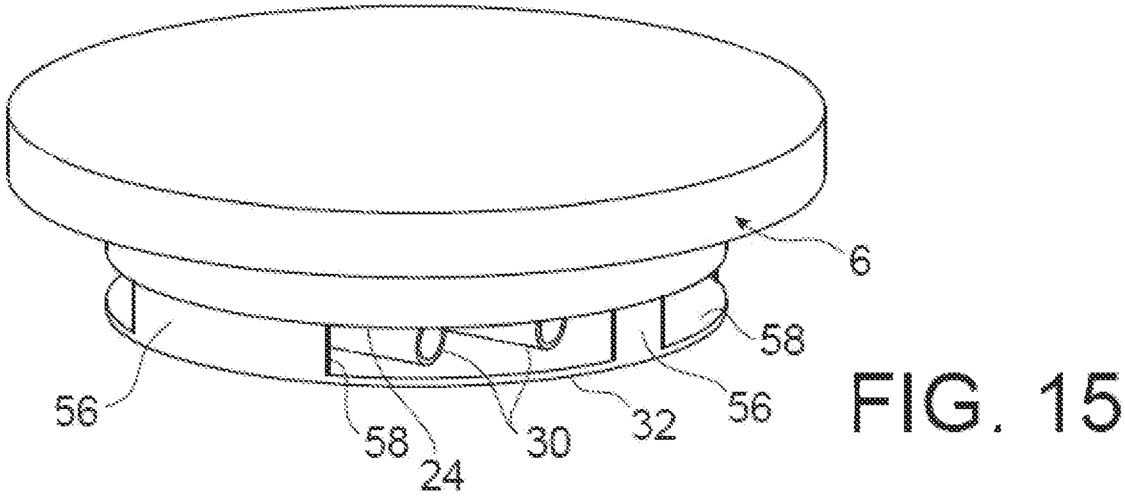
FIG. 15 is a perspective view of the lid and of the internal shock-absorber shown in FIG. 13.

Finally, FIGS. 13 to 15 show an example of embodiment for attaching the distribution plate 32, here in disc shape, on the lid 6. Around its periphery, the plate 32 is equipped with connector members 56 welded on the lid, and circumferentially spaced apart from one another. This makes it possible to facilitate the drying of the internal shock-absorber 22 after the packaging has been removed from the water, since it can be evacuated by the preferably open ends of the tubes 30, then by the radial spaces 58 defined between the connector members 56.

Of course, various modifications may be made by the person skilled in the art to the invention as described, by way of non-limiting examples only, the scope of which is defined by the appended claims. In particular, all of the embodiments and alternative embodiments described above can be combined with each other.

What is claimed is:

1. Packaging for transporting and/or storing a set of radioactive materials, the packaging comprising a lateral body extending about a longitudinal central axis of the packaging, as well as a bottom and a removable lid respectively arranged at the axial ends of the lateral body of the packaging, the latter delimiting, with the bottom and the removable lid, a containment chamber for housing the set of radioactive materials, the packaging also including an internal shock-absorber housed in the containment chamber and intended to be arranged axially between the removable lid and the set of radioactive materials, wherein the internal shock-absorber-includes a single layer of tubes for absorbing shocks by plastic deformation, or a plurality of layers of tubes for absorbing shocks by plastic deformation, each layer being arranged in a layer plane orthogonal to the longitudinal central axis of the packaging, the shock-absorbing tubes all having, within the same layer, an annular or substantially annular cross-section from at most three different reference cross-sections, each tube extending along a longitudinal line of the tube and all of the longitudinal central lines of the tubes of the same layer being inscribed in the layer plane of the layer concerned, wherein the number and the dimensions of the shock-absorbing tubes of each layer are provided such that, in an axial view of the packaging, the ratio between on the one hand the cumulative projected area of all of the shock-absorbing tubes of the layer, and on the other hand the surface area defined internally by the notional circle of smallest diameter in which all of these shock-absorbing tubes are circumscribed is greater than 0.2, and wherein within each layer, in axial view of the packaging, the shock-absorbing tubes are transversally spaced apart from one another so that in a transverse direction of each tube, the latter has opposite any other tube of the same layer, a minimum transverse spacing greater than or equal to 0.4*Dext, where "Dext" corresponds to the external diameter of the shock-absorbing tube considered.

2. The packaging according to claim 1, wherein each shock-absorbing tube has a ratio, between a wall thickness and a external diameter, between 0.08 and 0.2.

3. The packaging according to claim 2, wherein the ratio is between 0.09 and 0.15.

4. The packaging according to claim 1, wherein at least some of the tubes are straight, with their longitudinal central lines corresponding to axes of revolution.

5. The packaging according to claim 4, wherein the axes of revolution are all parallel with one another and/or combined within the same layer.

6. The packaging according to claim 1, wherein at least some of the tubes are in the shape of an arc of a circle, and/or of concentric tori.

7. The packaging according to claim 1, wherein the shock-absorbing tubes all having, within the same layer, a same annular or substantially annular cross-section.

8. The packaging according to claim 1, wherein all of the shock-absorbing tubes have an annular or substantially annular cross-section the inner perimeter of which is circular.

9. The packaging according to claim 1, wherein the internal shock-absorber includes a force distribution plate arranged between the set of radioactive materials and the shock-absorbing tubes of the single layer.

10. The packaging according to claim 9, wherein at least some of the shock-absorbing tubes are attached to the force distribution plate by welding.

11. The packaging according to claim 9, wherein at least some of the shock-absorbing tubes have a mortise and tenon assembly with the force distribution plate.

12. The packaging according to claim 1, wherein the internal shock-absorber includes a force distribution plate arranged between two directly consecutive layers of tubes.

13. The packaging according to claim 1, wherein the internal shock-absorber is attached on the removable lid so as to be in contact with an inner surface of this lid.

14. The packaging according to claim 13, wherein the attachment is performed by welding or by screw elements.

15. The packaging according to claim 1, wherein the shock-absorbing tubes are made of stainless steel.

16. The packaging according to claim 1, wherein the internal shock-absorber, certain straight tubes are arranged coaxially.

17. The packaging according to claim 1, characterised in that the lid is mounted on a front end of the lateral body of the packaging using screw elements distributed around the periphery of the lid.

18. A package comprising the packaging according to claim 1, as well as a set of radioactive materials housed in the containment chamber of the packaging.

19. The package according to claim 18, characterised in that the set of radioactive materials comprises one or more sealed canisters housing radioactive materials, or it comprises a storage basket housing a plurality of nuclear fuel assemblies.

* * * * *